United States Patent
Raviola et al.

(10) Patent No.: US 8,301,274 B2
(45) Date of Patent: Oct. 30, 2012

(54) METHOD FOR MANAGING PRODUCT SEGMENTS OF PRODUCT PRODUCTION RULES

(75) Inventors: Alessandro Raviola, Genoa (IT); Elena Reggio, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 274 days.

(21) Appl. No.: 12/758,335

(22) Filed: Apr. 12, 2010

(65) Prior Publication Data

US 2010/0268365 A1 Oct. 21, 2010

(30) Foreign Application Priority Data

Apr. 20, 2009 (EP) .................................. 09158208

(51) Int. Cl.
*G06F 19/00* (2011.01)
(52) U.S. Cl. .......................................... 700/26; 700/105
(58) Field of Classification Search .................... 700/26, 700/51, 104, 105, 95, 115, 108, 121; 702/188
See application file for complete search history.

(56) References Cited

U.S. PATENT DOCUMENTS

| | | | |
|---|---|---|---|
| 6,615,090 B1 * | 9/2003 | Blevins et al. ................. | 700/26 |
| 6,839,713 B1 * | 1/2005 | Shi et al. ........................... | 1/1 |
| 6,970,758 B1 * | 11/2005 | Shi et al. ....................... | 700/108 |
| 7,076,453 B2 * | 7/2006 | Jammes et al. ............ | 705/26.62 |
| 2002/0165636 A1 * | 11/2002 | Hasan .......................... | 700/121 |
| 2002/0193902 A1 * | 12/2002 | Shanmugasundram et al. ............................. | 700/121 |
| 2006/0271223 A1 | 11/2006 | Gartland et al. | |
| 2007/0225848 A1 * | 9/2007 | Chang et al. ................... | 700/101 |
| 2008/0103617 A1 | 5/2008 | Subramanian et al. | |

FOREIGN PATENT DOCUMENTS

WO 2006125771 A1 11/2006

OTHER PUBLICATIONS

European Search Report dated Sep. 2, 2009.

* cited by examiner

*Primary Examiner* — Kidest Bahta
(74) *Attorney, Agent, or Firm* — Laurence A. Greenberg; Werner H. Stemer; Ralph E. Locher

(57) ABSTRACT

An effective method for managing product segments of product production rules within a manufacturing execution system adapted for providing a final product includes the following steps: a) each one of a plurality of sets of product segments are associated within one of a set of product production rules which are stored in a database under a reference standard product production rule (like a simple "manufacture of a car"); b) a command (e.g. from an operator) is inputted to the database for performing one of following selectable operations: i) add a new product segment; ii) remove one of previous product segment; iii) replace a previous product segment by a new one; c) a further set of new product production rules comprising previous product segments and a further product segment (related to the selectable operation and automatically detected in each product production rule) are introduced in the database; d) an indicator related to the selected operation (i, ii, iii) is inserted in said new product production rule. Finally, e) an algebraic operation is performed on all product segments of both the reference standard product production rule and the new product production rules (for example it performs an addition of the product segments), so that the algebraic operation delivers a final standard product production rule resulting from one of the selected operations of adding i), removing ii), replacing iii).

6 Claims, 1 Drawing Sheet

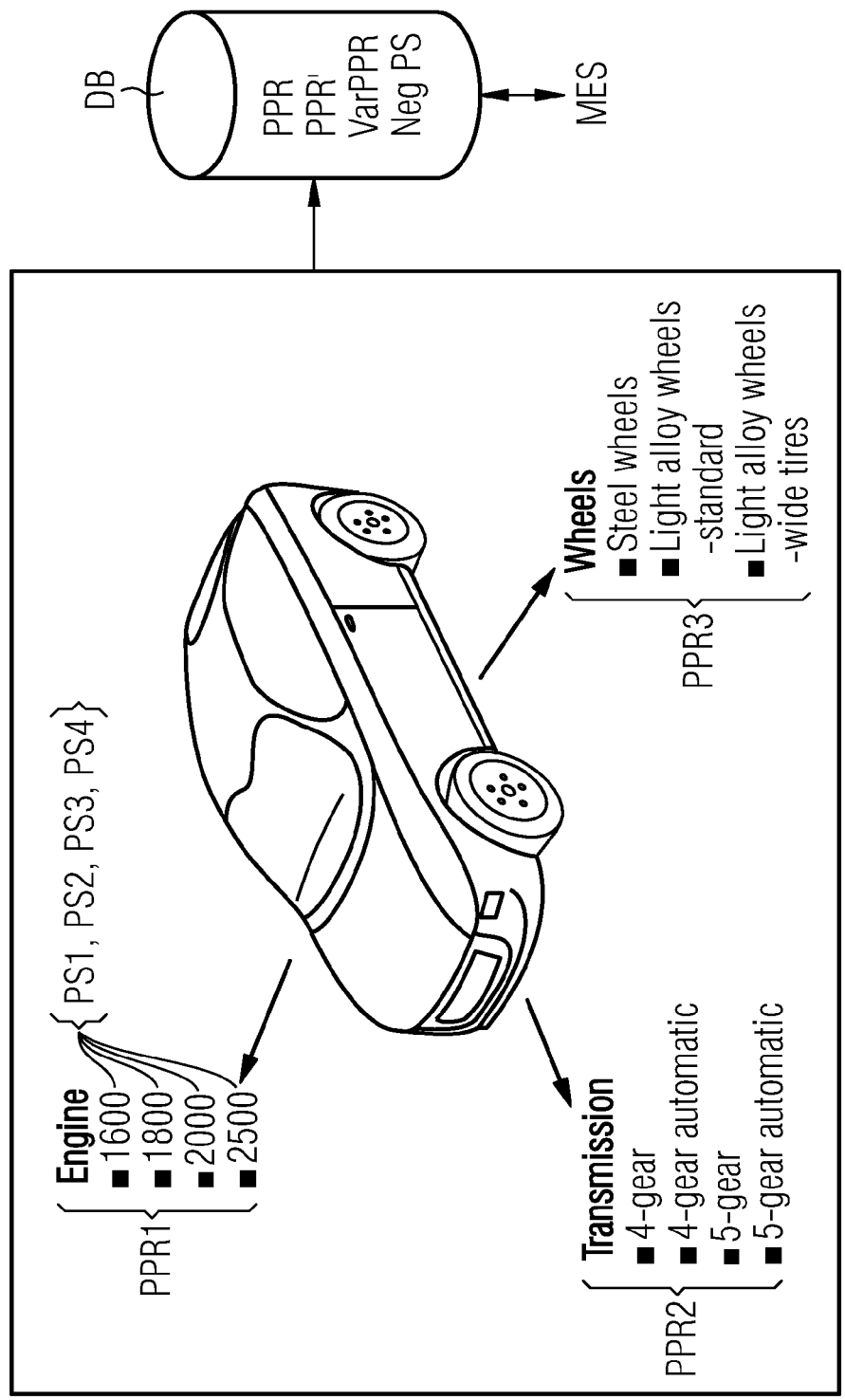

METHOD FOR MANAGING PRODUCT SEGMENTS OF PRODUCT PRODUCTION RULES

CROSS-REFERENCE TO RELATED APPLICATION

This application claims the priority, under 35 U.S.C. §119, of European patent application EP 09158208, filed Apr. 20, 2009; the prior application is herewith incorporated by reference in its entirety.

BACKGROUND OF THE INVENTION

Field of the Invention

The present invention relates to a method for managing product segments of product production rules within a manufacturing execution system (MES) adapted for providing a final product.

In the world of process automation and process monitoring standard automation systems for controlling the widest conceivable variety of machines and plants are state of the art. Such technology covers in particular a broad range of products which are offered by the Siemens Corp. under its SIMATIC® product family within the field of manufacturing execution systems (MES). An extensive line of products for solving the technical tasks in question such as counting, measuring, positioning, motion control, closed-loop control and cam control enhance the performance capabilities of appropriate process controllers. A variety of configurations enable the implementation of flexible machine concepts.

In this context a broad range of IT solutions exist to connect the actual hardware close to the technical and/or logistical process to the application layer of the client driving the installation. Manufacturing execution systems have therefore been developed to meet all of the requirements of a service oriented architecture (SOA) to integrate seamlessly into a totally integrated automation (TIA). A plug & play architecture, in which the individual functions can be easily combined and configured with each other thereby forms the basis for this success thereby simplifying the complex structures of controlling a manufacturing plant or the like.

These demands very often require in the backbone rather complicated and sophisticated software solutions which enable the approach of totally integrated automation. In view of this, the software engineers very often use production moduler to define the plant model and its standard operating procedures and create the respective new software by means of a high level graphical language which identifies the workflow of activities within the software. Subsequently, this string/term of high level graphical language is translated into a client based software language executable on the machine language level. This translation requires tremendous efforts in programming and need serious testing to check whether the translated program behaves the same as the original string/term of the high level graphical language.

For modeling in a technical way the production system it is required to divide the productive process in many steps (hereinafter called product segments PS) so that each of the product segments represents a simple action or feature that can be controlled by the MES system. This subdivision must take care of all dependencies existing between the product segments in order to guarantee that the entire production will be executed in the correct way.

In the real environment, the product segments are managed in a likesome database by means of product production rules (PPR) in which a kind of product segments is registered.

According to this procedure, a person who manages the database has to identify each kind of involved product segments and to select an adequate product production rule in order to input/replace/delete a product segment within the correct product production rule. Due to the high amount of product production rules in relation to a final product or parts thereof it is hence very complex as well as time consuming to actualize them by each modification of one or more product segments.

An example can be easily illustrated, with FIG. 1 presenting the manufacture of a car, simplified here with only four product production rules PPR1, PPR2, PPR3, PPR4 (the car itself, the engine, the transmission, the wheels). Each of these product production rules contains following product segments:

PPR1: the car has one product segment (the car itself as final product)

PPR2: the engine has four products segments given by different motor powers "1600, 1800, 2000, 2500";

PPR3: the transmission has four products segments given by different systems "4-gear, 4-gear automatic 5-gear, 5-gear automatic";

PPR4: the wheels have three product segments given by the kind or size "steel wheels, light alloy wheels—standard, light alloy wheels—wide tires".

For this simple configuration, a plurality of 48 PPRs versions can be defined (one for each combination with others). So it is obvious that even a person skilled in the art of managing product segments for a larger amount of PPRs or PSs makes use of automatic filters to actualize product segments, the processing time of this action can be very long and in a worst case he will have to update manually the database or define new changes of structure in the database for keeping it as simple and transparent as possible. Additiononaly the amount of informations to be actualized can reach very high levels because the number of PPRs for a basic PPR (the car itself) increases proportionally with each new version of product segment. A high quantity of basic informations (in term of modifying product segments) that are not exactly depending on a certain part of product variants can also lead to introduce duplicated PPRs which are absolutely useless in a further manufacturing execution system. Hence a huge storage of database can be unfortunately required that can also make the further processes of manufacturing slower. Moreover, a risk of missing local actualizations can arise if an unexpectable allocation of memory fails. That means also that an operator being in such a unsecure situation has to check the validity of the data manually, and if needed to correct the wrong data by searching possible failures. This, accordingly, is absolutely not secure and it requires a very great deal of knowledge of the database and a very long amount of time. This, of course, is very inconvient in a production manufacturing line.

SUMMARY OF THE INVENTION

It is accordingly an object of the invention to provide a method for managing product segments of product production rules which overcomes the above-mentioned disadvantages of the heretofore-known devices and methods of this general type and which provides for a method for managing product segments of product production rules within a manufacturing execution system (MES) in a way for keeping the structure of PPRs more simple and secure by any kind of modification of product segments in a database, especially again the above mentioned drawbacks. The novel method may also provide an automatical updating of the database with a minimal amount of inputted information or knowledge from an operator that engages in the database a command for adding, deleting or replacing a product segment.

With the foregoing and other objects in view there is provided, in accordance with the invention, a method for managing product segments of product production rules within a manufacturing execution system (MES) adapted to provide a final product, the method which comprises:

a) associating each one of a plurality of sets of product segments within one of a set of product production rules that are stored in a database under a reference standard product production rule;
b) inputting a command to the database for performing one of following selectable operations:
   i) add a new product segment;
   ii) remove a previous product segment;
   iii) replace a previous product segment with a new product segment;
c) introducing a further set of new product production rules comprising previous product segments and a further product segment in the database;
d) inserting an indicator related to the operation (i, ii, iii) selected in step b) in the new product production rule; and
e) performing an algebraic operation on all product segments of both the reference standard product production rule and the new product production rules, so that the algebraic operation delivers a final standard product production rule resulting from one of the operations of adding i), removing ii), replacing iii) selected in step b).

In other words, the objects of the invention are achieved by a method for managing product segments of product production rules within a manufacturing execution system adapted for providing a final product like the previous car to be manufactured, according to following steps: a) each one of a plurality of sets of product segments are associated within one of a set of product production rules which are stored in a database under a reference standard product production rule (like a simple "manufacture of a car"); b) a command (e.g. from an operator) is inputted to the database for performing one of following selectable operations: i) add a new product segment; ii) remove one of previous product segment; iii) replace a previous product segment by a new one; c) a further set of new (possibly variant or tempory) product production rules comprising previous product segments and a further product segment (related to the selectable operation and automatically detected in each product production rule) are introduced in said database; d) an indicator related to the selected operation (i, ii, iii) is inserted in said new product production rule; and e) an algebraic operation is performed on all product segments of both said reference standard product production rule and said new product production rules (for example it performs a addition of said product segments), so that said algebraic operation delivers a final standard product production rule resulting from one of the selected operations of adding i), removing ii), replacing iii).

This resulting final standard product production rule can replace the reference standard product production rule in the database, but it is not always required especially for purpose of extending/completing the database.

In another words and thanks to the algebraic operation, all product segments of concerned product production rules will be algebraically added with all product segment of some "variant" new product production rules which contain by mean of said indicator for example an added sign dependent product segment in relation to an action for deleting or adding (and a fortiori for replacing). This method is hence fully independent of any local manual intervention.

The tempory allocation of product production rules corresponding to the structure of said reference standard product production rule permits to create a likesome "variant" mirror of this one, except at the location(s) where an add, delete or replace action has to be executed (that means where said product segment hast to be added, deleted or replaced). By this way the method according to the invention cannot miss any actualization of the database because the whole structure of the reference standard product production rule will be processed. A risk of missing a product segment or duplicating superficial product production rules or their product segments is hence also completely avoided. The previous said tempory allocation in a provisional memory space can be also removed at the end of the process, so that no unused memory of provisional data has to be kept in the database. The level of memory required for applying the temporary allocation is also defined (e.g. the memory amount of the memory of databse under the reference standard product production rule with maximally an additional memory space for said indicator and said product segment to be added, deleted or replaced in each product production rule)

Especially at the places for adding or deleting (i, ii) a new/previous product segment, said indicator comprises a positive or negative sign that is simply assigned on said product segment to be added or deleted. This can be done by an operator that chooses the action to be led over a command of adding or deleting a designated product segment and enter these only data.

For the action of replacing (iii) a previous product segment by a new one said indicator comprise ideally a priority information that is selectively attached to each product segment and said priority information provides a position of replacement in a list of priority assigned product segments. Such a priority of information can be automatically inserted in all created new product production rules that contains a category of the product segment to be replaced.

It is also possible that said indicator comprises an information on at least one type of a category (1600, 1800, 2000, 2500) of product segments so that the add-, delete- or replace- actions can be performed more selectively, but this alternative requires a better knowledge of the database (at least from all kind of a serie of product segments, like the different versions of motorization of a car).

The method as described mentions for purpose of clarity only two levels that consist in product production rules and product segements, but said reference standard product production rule and said new variant product production rules comprises hierarchically connected sub-"product production rules" that contains the or further product segments on which said management according to the invention is applied recursively. That means that the method can be identically applied as well on basic product production rule as on sub-"product production rules", like in a tree manner.

Other features which are considered as characteristic for the invention are set forth in the appended claims.

Although the invention is illustrated and described herein as embodied in a method for managing product segments of product production rules, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing is a schematic illustrating a production system within a manufacturing execution system.

DETAILED DESCRIPTION OF THE INVENTION

Referring now to the FIGURE of the drawing in detail, a preferred example of the present invention is now described hereinafter in detail with reference to the FIGURE. The acronyms "PS" and "PPR" will be commonly used for designating product segment and product production rule, respectively.

The method according to the invention performs a dynamic process on the correct set of PSs in order to create a new permanent PPR that defines how to manufacture a specific final product. The new PPR can be maintained or removed according to the user choice.

To achieve this result a new type of PPR (also called "Variant PPR"=new PPR) and a new type of PS (also called "Negative PS") have to be introduced. The Negative PS can only belong to a Variant PPR. The Negative PS relates to the indicator (ot its content) as previoulsy defined.

Considering the variants showed in the drawing, three Variant PPRs are necessary: one for the Engine, one for the Transmission, one for the Wheels. All these Variant PPRs refer to a reference standard PPR that defines the car with a basic assortment (for example engine 1600, transmission 4-gear, steel wheels).

Each Variant PPR contains as many standard PSs (in an alternative way) as the number of variants of PSs (except the basic part, already included in the standard PPR) and a Negative PS. The Negative PS is referred to one of a corresponding PS in the standard PPR.

For instance the Variant PPR for the Engine has the Negative PS related to the engine 1600 (basic), and three standard PS for 1800, 2000 and 2500 in alternative.

As previously said, the present invention according to drawing presents a method for managing product segments (PS1=1600, 1800, 2000, 2500; PS2=4-gear, 4-gear automatic, 5-gear, 5-gear automatic; PS3=; etc) of product production rules "Engine, Transmission, Wheels" (PPR1, PPR2, PPR3) within a manufacturing execution system (MES) adapted for providing a final product (a car for example), according to following steps:
 a) each one of a plurality of sets of product segments are associated within one of a set of product production rules which are stored in a database (DB) under a reference standard product production rule (PPR, e.g. see in further description a version of such a PPR called "MyCar v1.0");
 b) a command is inputted to the database for performing one of following selectable operations:
  i) add a new product segment;
  ii) remove one of previous product segment;
  iii) replace a previous product segment by a new one;
 c) a further set of new product production rules (VarPPR) comprising previous product segments and a further product segment (NegPS) are introduced in said database;
 d) an indicator related to the selected operation (i, ii, iii) is inserted in said new product production rule (VarPPR);
 e) an algebraic operation is performed on all product segments of both said reference standard product production rule (PPR) and said tempory product production rules (VarPPR), so that said algebraic operation delivers a final standard product production rule (PPR') resulting from one of the selected operations of adding i), removing ii), replacing iii).

General Processing:

A standard PPR and a list of Variant PPRs are considered whose combination provides the temporary PPR.

This association provides a matrix with all possible product configurations comprising the standard PPR and the list of Variants PPR that must be combined to obtain a given product (e.g. the car having the engine 2000, the steel wheels and the transmission 5-gear).

The process according to the invention can be formulated under following steps:
 a) checks at the input of command which are all concerned PPRs and forms the corresponding Variant PPRs
 b) combines in an algebraic expression the Product Segments of all the PPRs provided from the input of command
 c) evaluates result of said expression by associated algebraically the PSs according to their dependencies on PPRs and their kind or term
 d) returns a new standard PPR resulting from the evaluation According to the expression the following operations can be performed: Insertion, Replacement, Deletion of Product Segments.

Composition of Resulting PPR:

The PPR resulting from the above-mentioned procedure is populated with all Product Segments resulting from the algebraic combination of the input PPRs. Basic configuration elements of this resulting PPR such as associated Plant, final product, life cycle and so on, are the same as the one of the standard PPR provided in input.

All the dependencies among the remaining Product Segments are copied in the new PPR.

PPR Compatibility:

If the procedure has no sense when evaluating an algebraic expression whose PSs are simply incompatible, it is possible before starting the procedure for creating Variant PPRs to consider this compatibility among the various PPR that should effectively be managed.

By default, a PPR compatible can be considered compatible with all first standard PPRs. To make a PPR incompatible with other PPRs, the indicator can for example contains an explicit incompatible or compatible relationship between each couple of PPRs.

Algebraic Expression Rules:

When the algebraic expression is evaluated, the main points to be considered can be presented as follows:
 The order of the expression PS's terms
 The term
 The possible terms involved in the expression are:
  Product Segment
  Negative Product Segments
 The terms in the expression are sorted according to a sorted list provided in input to the method:
  The first term is the Standard PPR. This PPR is used to get the basic configuration for the resulting PPR.
  The other terms are the Variant PPRs ordered as in the sorted list given in input to the method.

For the following description, let us assume the following notation:

| Notation | Description |
|---|---|
| $PS_{PPR,ver}$(<PS>) | Data structure identifying the PS of a specific PPR's version |
| $\overline{PS}_{VarPPR,ver}$(<PPR>,<ver>,<PS>) | Data structure identifying the Negative PS of a Variant PPR version, related to a PS of a specific PPR's version |

The applied rules are the following:
- A PS's term, which is present more than one time in the expression, is replaced with its last occurrence. See PPR with replacement example
- A negative PS's term removes the related PS's term of standard PPR. If the related PS X is not present in the expression, then nothing happens. See PPR with negation example
- A negative PS's term which does not specify (for example over the indicator) a specific PPR name and version removes all occurrences of the PS's terms with the same name. See PPR with PS omission example
- A PS in the expression which does not have a corresponding similar PS or a negative PS is copied/kept as it is.
- A negative PS's term which does not specify a PPR version removes all occurrences of the PS's terms of all previous PPR versions.

Basic PPR and Variant PPRs to Replace a PS:

Suppose to manufacture a car with some variants according to drawing 1. We can consider the following basic PPR to produce a version called "MyCar v1.0" with its manufacturing phases (Product Segments):

| MyCar v1.0 |
|---|
| Welding PS |
| Painting PS |
| Assembly PS |
| Engine Sub-Assembly PS (configured with 1600 engine) |
| Gear Sub-Assembly PS (configured with 4-gear) | and the following Variant PPR related to a engines version "Engines v1.0":

| Engines v1.0 |
|---|
| $\overline{\text{Engine Sub-Assembly PS}}$ |
| 1800 Engine Sub-Assembly PS - priority 1 |
| 2000 Engine Sub-Assembly PS - priority 0 ✓ |
| 2500 Engine Sub-Assembly PS - priority 2 |

The overlined characters (here for "Engine Sub-Assembly") means the use of a so called "negative" PS which will be useful for the algebraic expression, according to the command and its indicator.

For the last group of alternative product segments 1800, 2000, 2500 in the previous Variant PPR for engines, a priority is defined and assigned to some PSs as part of previous mentioned indicator comprising a positive integer 0, 1, 2, etc. providing two possible informations: it identifies an alternative PS within the group (which could also comprise n entities (n>=1), for example the priority 0 could also be assigned to two (n=2) types/entities of "Sub-Engines" 2000 and 2200) and it provides a well adapted mean for selecting one of the PSs (0 being the highest, while the level decreases as the number gets higher). In this example, the algebraic evaluation takes here into consideration only the highest priority of a Product Segment to be replaced in that we want to obtain a new version of "MyCar v1.0" having the engine 2000 in place of the 1600 engine (ex-priority set on zero).

By means of all PSs of "MyCar v1.0" and "Engines v1.0", the algebraic evaluation is performed in this way:

Welding PS + Painting PS + Assembly PS + Engine Sub-Assembly PS (1600) + Gear Sub-Assembly PS + $\overline{\text{Engine Sub-Assembly PS}}$ (1600) + Engine Sub-Assembly PS (2000)

The term 1600 with priority zero from PPR and variant PPR are algebraically eliminated and the resultant PPR is created as a new version "MyCar v2.0" of PPR related to the car:

| MyCar v2.0 |
|---|
| Welding PS |
| Painting PS |
| Assembly PS |
| Gear Sub-Assembly PS (configured with 4-gear) |
| 2000 Engine Sub-Assembly PS |

Basic PPR and Variant PPRs to Delete a PS

Suppose to manufacture a car with some variants.

We can consider the following basic PPR to describe the version "MyCar v1.0" with its manufacturing phases (Product Segments):

| MyCar v1.0 |
|---|
| Welding PS |
| Painting PS |
| Assembly PS |
| Engine Sub-Assembly PS (configured with 1600 engine) |
| Gear Sub-Assembly PS (configured with 4-gear) |
| Sensor Testing PS | and the following Variant PPR:

| NoQualityTest v1.0 |
|---|
| $\overline{\text{Sensor Testing PS}}$ |

In case of deleting the PS called "sensor testing" that belongs to the sub-PPR "quality test phase", such a "negative" variant PPR "NoQualityTest v1.0" will be also algebraically created and then combined with the basic PPR "MyCar v1.0".

After combination of PPRs "MyCar v1.0" and "NoQualityTest v1.0", the algebraic evaluation is performed in this way:

Welding PS + Painting PS + Assembly PS + Engine Sub-Assembly PS + Gear Sub-Assembly PS + Sensor Testing PS + $\overline{\text{Sensor Testing PS}}$ and the new resultant PPR called "MyCar v2.0" is:

| MyCar v2.0 |
| --- |
| Welding PS |
| Painting PS |
| Assembly PS |
| Engine Sub-Assembly PS (configured with 1600 engine) |
| Gear Sub-Assembly PS (configured with 4-gear) |

By this operation the selected PS in the variant PPR has been assigned by a negative sign in order to cancel algebraically the corresponding "positive" PS in the basic PPR.

The principle of adding a PS according to the invention is the same of the deletion, except that a positive sign will be assigned to the selected PS to be added.

The indicator used by such a command of adding/deleting comprises the mean for assignment of a positive or negative sign in the variant PPR.

In the following text, there is also an example on how it is possible to implement an algorithm on a server with a database in order to apply the method according to the invention:

PPR with Replacement Example

The following initial configuration comprises:
A standard PPR named PPR1 with a PS named PS1
A Variant PPR named VarPPR1 with two PSs named PS1 and PS2
A Variant PPR named VarPPR2 with a PS named PS2

The algebraic evaluation is performed on the following items
$PS_{PPR1,1.0}(PS1)$,
$PS_{VarPPR1,1.0}(PS2)$,
$PS_{VarPPR1,1.0}(PS1)$,
$PS_{VarPPR2,1.0}(PS2)$ The resultant PPR will have a copy of the following the Product Segments:
$PS_{VarPPR1,1.0}(PS1)$,
$PS_{VarPPR2,1.0}(PS2)$ PS1 and PS2 have been replaced with the last occurrences of PS1 and PS2.

PPR with Negation Example

The following initial configuration comprises (the names of Negative PSs are irrelevant in this example):
A standard PPR named PPR1 with a PS named PS1
A Variant PPR named VarPPR1 with a PS named PS2 and a Negative PS configured as:
Name: NPS1
Linked PPR: PPR1
Linked PPR Version: 1.0
Linked PS: PS1
A Variant PPR named VarPPR2 with a PS named PS3 and a Negative PS named NPS1 configured as:
Name: NPS1
Linked PPR: VarPPR1
Linked PPR Version: 1.0
Linked PS: PS2

The algebraic evaluation is performed on the following items
$PS_{PPR1,1.0}(PS1)$,
$PS_{VarPPR1,1.0}(PS2)$,
$\overline{PS}_{VarPPR1,1.0}(PPR1;1.0;PS1)$,
$PS_{VarPPR2,1.0}(PS3)$,
$\overline{PS}_{VarPPR2,1.0}(VarPPR1;1.0;PS2)$ The resultant PPR will have a copy of the following item:
$PS_{VarPPR2,1.0}(PS3)$ PS3 is copied from VarPPR2 though, due to the inclusion of Negative PSs, the other PSs are not copied.

PPR with PS Omission Example (Addition of an Omitted PS in a PPR)

The following initial configuration (the names of Negative PSs are irrelevant in this example):
A standard PPR named PPR1 with a PS named PS1
A Variant PPR named VarPPR1 with a PS named PS2 and a Negative PS configured as:
Name: NPS1
Linked PPR: (none specified)
Linked PPR Version: (none specified)
Linked PS: PS1
A Variant PPR named VarPPR2 with a PS named PS1

The algebraic evaluation is performed on the following items:
$PS_{PPR1,1.0}(PS1)$,
$PS_{VarPPR1,1.0}(PS2)$,
$\overline{PS}_{VarPPR1,1.0}(\cdot;\cdot;PS1)$,
$PS_{VarPPR2,1.0}(PS1)$ The resultant PPR will have the following item:
$PS_{VarPPR1,1.0}(PS2)$ PS2 is copied from VarPPR1 and all PSs named PS1 have been excluded from resultant PPR.

Accordingly, the new version of VarPPR1 contains PS2 but not PS1.

The invention claimed is:

1. A method for managing product segments of product production rules within a manufacturing execution system adapted to provide a final product, the method applied as an algorithm implemented on a server with a database and comprising the steps of:
   a) associating each one of a plurality of sets of product segments within one of a set of product production rules that are stored in the database under a reference standard product production rule;
   b) inputting a command to the database for performing one of following selectable operations:
      i) add a new product segment;
      ii) remove a previous product segment;
      iii) replace a previous product segment with a new product segment;
   c) introducing a further set of new product production rules comprising previous product segments and a further product segment in the database;
   d) inserting an indicator related to operation (i, ii, iii) selected in step b) in the new product production rule; and
   e) performing an algebraic operation on all product segments of both the reference standard product production rule and the new product production rules, so that the algebraic operation delivers a final standard product production rule (PPR') resulting from one of the operations of adding i), removing ii), replacing iii) selected in step b).

2. The method according to claim 1, wherein the indicator comprises a positive sign for adding (i) a new product segment or a negative sign for deleting (ii) a previous product segment.

3. The method according to claim 2, wherein the indicator for replacing (iii) a previous product segment with a new product segment comprises a priority information that is selectively attached to each product segment and the priority information provides a position of replacement in a list of priority assigned product segments.

4. The method according to claim 1, wherein the indicator for replacing (iii) a previous product segment with a new product segment comprises a priority information that is selectively attached to each product segment and the priority information provides a position of replacement in a list of priority assigned product segments.

5. The method according to claim 1, wherein the indicator comprises each type of a category of product segments.

6. The method according to claim 1, wherein the reference standard product production rule and the new product production rules comprise hierarchically connected sub-product production rules that contain further product segments on which the management is applied recursively.

* * * * *